June 14, 1927.
J. H. SAGER
BUMPER
Filed Feb. 14, 1927
1,632,563
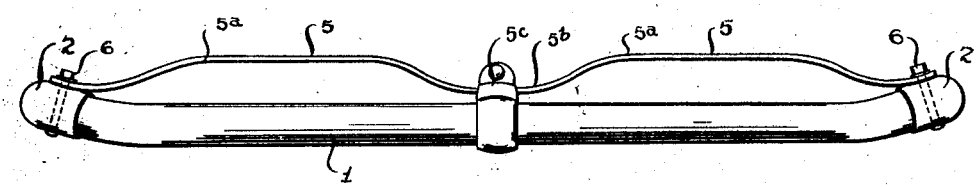
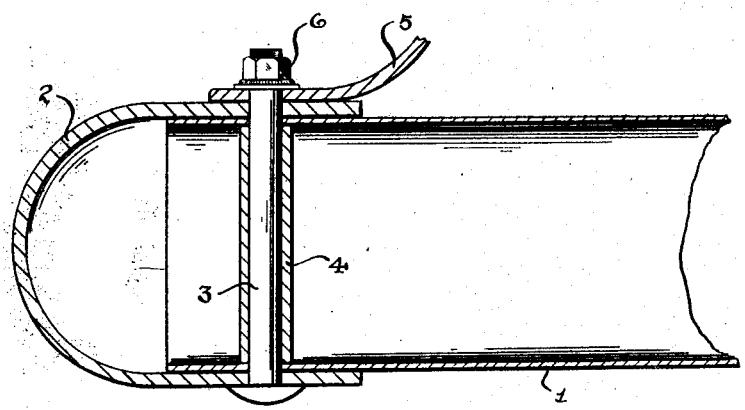
INVENTOR
James H. Sager
BY
his ATTORNEY Patented June 14, 1927.

1,632,563

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

BUMPER.

Application filed February 14, 1927. Serial No. 167,967.

The present invention relates to bumpers for motor vehicles and an object of the invention is to provide a novel construction by which a single bolt or fastener may be employed for holding a cap on the end of a tubular impact member and for anchoring one end of a supporting spring for the impact member.

To these and other ends, the invention consists of certain parts and combinations of parts, all of which will be hereinafter described; the novel features being pointed out in the appended claims.

In the drawings:

Fig. 1 is a plan view of the bumper constructed in accordance with this invention; and Fig. 2 is a fragmentary sectional view through one end of the impact member, the cap and the supporting spring.

Referring more particularly to the drawings, 1 indicates the impact member which, in this instance, is in the form of an open ended tube having its ends covered by caps 2 fitting on the exterior of the tube 1. Passing through the tube and each cap is a bolt or fastener 3 which, within the tube 1 is surrounded by a sleeve 4, the ends of which abut the inner wall of the tube 1 about the openings in such tube. This bolt 3 also serves for securing one end of a bumper supporting spring 5 which may be of any suitable construction but which consists, in this instance, of a single bar with two rearwardly deflected portions 5$^a$ and a forwardly deflected portion 5$^b$ secured to the impact bar at 5$^c$. The bolt 3 passes through an opening in one end of the spring and is held against the inner face of the cap 2 by a nut 6.

It will thus be seen that the tubular impact 1, one of the caps 2, and one end of the bumper supporting spring 5 are held by a single bolt or fastener. This bolt or fastener is surrounded within the tubular impact member by a sleeve which prevents the distortion of the impact member through the turning of the nut 6 too tightly.

What I claim as my invention and desire to secure by Letters Patent is:

1. The combination with a tubular impact member of a cap fitting over the same, a bumper supporting spring and a single bolt securing the tubular impact member, the cap and the bumper supporting spring.

2. The combination with a tubular impact member of a cap fitting over the same, a bumper supporting spring, a bolt passing through the tubular impact member, the cap and the bumper supporting spring and a sleeve surrounding said bolt within the impact member to prevent the compression of the impact member.

JAMES H. SAGER.